United States Patent
Wang et al.

(10) Patent No.: US 10,120,806 B2
(45) Date of Patent: Nov. 6, 2018

(54) MULTI-LEVEL SYSTEM MEMORY WITH NEAR MEMORY SCRUBBING BASED ON PREDICTED FAR MEMORY IDLE TIME

(71) Applicant: INTEL CORPORATION, Santa Clara, CA (US)

(72) Inventors: Zhe Wang, Hillsboro, OR (US); Christopher B. Wilkerson, Portland, OR (US); Zeshan A. Chishti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/193,952

(22) Filed: Jun. 27, 2016

(65) Prior Publication Data
US 2017/0371795 A1 Dec. 28, 2017

(51) Int. Cl.
*G06F 12/00* (2006.01)
*G06F 12/0873* (2016.01)
(Continued)

(52) U.S. Cl.
CPC ........ *G06F 12/0873* (2013.01); *G06F 12/124* (2013.01); *G06F 12/0804* (2013.01);
(Continued)

(58) Field of Classification Search
CPC . G06F 12/0873; G06F 12/124; G06F 12/0804
See application file for complete search history.

(56) References Cited

U.S. PATENT DOCUMENTS 5,440,686 A * 8/1995 Dahman ............... G06F 12/121
345/537
5,751,993 A 5/1998 Ofek et al.
(Continued)

FOREIGN PATENT DOCUMENTS

CN 1100540 A 3/1995
CN 101079003 A 11/2007
(Continued)

OTHER PUBLICATIONS

PCT Application No. PCT/US2017/029175, International Search Report and the Written Opinion, Jul. 28, 2017, 13 pgs.
(Continued)

*Primary Examiner* — Prasith Thammavong
(74) *Attorney, Agent, or Firm* — Compass IP Law PC

(57) ABSTRACT

An apparatus is described that includes a memory controller to interface to a multi-level system memory. The memory controller includes least recently used (LRU) circuitry to keep track of least recently used cache lines kept in a higher level of the multi-level system memory. The memory controller also includes idle time predictor circuitry to predict idle times of a lower level of the multi-level system memory. The memory controller is to write one or more lesser used cache lines from the higher level of the multi-level system memory to the lower level of the multi-level system memory in response to the idle time predictor circuitry indicating that an observed idle time of the lower level of the multi-level system memory is expected to be long enough to accommodate the write of the one or more lesser used cache lines from the higher level of the multi-level system memory to the lower level of the multi-level system memory.

18 Claims, 6 Drawing Sheets

(51) Int. Cl.
*G06F 12/123* (2016.01)
*G06F 12/0804* (2016.01)

(52) U.S. Cl.
CPC ............... *G06F 2212/1021* (2013.01); *G06F 2212/283* (2013.01); *G06F 2212/313* (2013.01); *G06F 2212/608* (2013.01)

(56) References Cited

U.S. PATENT DOCUMENTS

| | | | |
|---|---|---|---|
| 5,912,839 | A | 6/1999 | Ovshinsky et al. |
| 6,035,432 | A | 3/2000 | Jeddeloh |
| 6,292,874 | B1 | 9/2001 | Barnett |
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |
| 8,051,253 | B2 | 11/2011 | Okin et al. |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,605,531 | B2 | 12/2013 | Kau |
| 8,607,089 | B2 | 12/2013 | Qawami et al. |
| 8,612,676 | B2 | 12/2013 | Dahlen et al. |
| 8,612,809 | B2 | 12/2013 | Casper et al. |
| 8,626,997 | B2 | 1/2014 | Qawami et al. |
| 8,649,212 | B2 | 2/2014 | Kau et al. |
| 8,838,935 | B2 | 9/2014 | Hinton et al. |
| 9,087,584 | B2 | 7/2015 | Dahlen et al. |
| 9,342,453 | B2 | 5/2016 | Nale et al. |
| 9,378,133 | B2 | 6/2016 | Nachimuthu et al. |
| 9,378,142 | B2 | 6/2016 | Ramanujan et al. |
| 9,430,372 | B2 | 8/2016 | Nachimuthu et al. |
| 9,529,708 | B2 | 12/2016 | Puthiyedath et al. |
| 9,600,416 | B2 | 3/2017 | Ramanujan et al. |
| 9,619,408 | B2 | 4/2017 | Nale et al. |
| 9,690,493 | B2 | 6/2017 | Dahlen et al. |
| 2004/0148462 | A1 | 7/2004 | Uysal et al. |
| 2005/0038963 | A1* | 2/2005 | Royer ............... G06F 12/126 711/133 |
| 2005/0071601 | A1* | 3/2005 | Luick ............... G06F 12/0862 711/206 |
| 2006/0041721 | A1* | 2/2006 | Hakura ............... G06F 9/345 711/137 |
| 2007/0005922 | A1 | 1/2007 | Swaminathan et al. |
| 2007/0255891 | A1 | 11/2007 | Chow et al. |
| 2008/0016269 | A1 | 1/2008 | Chow et al. |
| 2008/0034148 | A1 | 2/2008 | Gower et al. |
| 2008/0082766 | A1 | 4/2008 | Okin et al. |
| 2008/0235443 | A1 | 9/2008 | Chow et al. |
| 2008/0270811 | A1 | 10/2008 | Chow et al. |
| 2009/0119498 | A1 | 5/2009 | Narayanan |
| 2009/0157954 | A1 | 6/2009 | Chung |
| 2009/0313416 | A1 | 12/2009 | Nation |
| 2010/0131827 | A1 | 5/2010 | Sokolov et al. |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0047365 | A1 | 2/2011 | Hentosh et al. |
| 2011/0060869 | A1 | 3/2011 | Schuette |
| 2011/0113202 | A1 | 5/2011 | Branover et al. |
| 2011/0119451 | A1* | 5/2011 | Fuller ............... G06F 12/0893 711/144 |
| 2011/0153916 | A1 | 6/2011 | Chinnaswamy |
| 2011/0291884 | A1 | 12/2011 | Oh et al. |
| 2013/0080813 | A1 | 3/2013 | Tarui et al. |
| 2013/0205097 | A1* | 8/2013 | Flynn ............... G06F 12/0246 711/142 |
| 2013/0268741 | A1 | 10/2013 | Daly et al. |
| 2013/0275661 | A1 | 10/2013 | Zimmer et al. |
| 2013/0282967 | A1 | 10/2013 | Ramanujan |
| 2013/0290597 | A1 | 10/2013 | Faber |
| 2014/0019677 | A1* | 1/2014 | Chang ............... G06F 12/0804 711/105 |
| 2014/0181412 | A1* | 6/2014 | Thottethodi ........ G06F 12/0871 711/133 |
| 2015/0186160 | A1* | 7/2015 | Arora ............... G06F 12/0864 713/1 |
| 2017/0031821 | A1 | 2/2017 | Ramanujan et al. |
| 2017/0052899 | A1* | 2/2017 | Lin ............... G06F 12/0897 |
| 2017/0139649 | A1 | 5/2017 | Puthiyedath et al. |
| 2017/0220264 | A1* | 8/2017 | Sokolov ............... G06F 3/0611 |
| 2017/0249250 | A1 | 8/2017 | Ramanujan et al. |
| 2017/0249266 | A1 | 8/2017 | Nale et al. |
| 2017/0329709 | A1* | 11/2017 | Lo ............... G06F 12/0835 |

FOREIGN PATENT DOCUMENTS

| | | |
|---|---|---|
| CN | 101620539 B | 12/2013 |
| WO | 2005002060 A2 | 1/2005 |

OTHER PUBLICATIONS

Lee, Hsien-Hsin, et al., "Improving Bandwidth Utilization Using Eager Writeback", Journal of Instruction-Level Parallelism 3 (2001), 22 pages.

Stuecheli, Jeffrey et al., "TheVirtual Write Queue: Coordinating DRAM and Last-Level Cache Policies", ISCA'10, Jun. 19-23, 2010, Saint-Malo, France, 11 pages.

"Phase change memory-based 'moneta' system points to the future of computer storage", ScienceBlog, Jun. 2, 2011, 7 pgs.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr-oceedings.sub.--Chrono.sub.--2011.html, Flash Memory Summit 2011 Proceedings, Aug. 11, 2011.

Bailey et al, "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

Dhiman, et al. "PDRAM: A Hybrid PRAM and DRAM Main Memory System", Jul. 26, 2009, Department of Computer Science and Engineering, 6 pages.

Freitas et al., "Storage-class memory: The next storage system technology", IBM J. Res. & Dev., Jul./Sep. 2008, pp. 439-447, vol. 52, No. 4/5.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

(56) References Cited

OTHER PUBLICATIONS

Mearian, "IBM announces computer memory breakthrough Phase-change memory offers 100 times the write performance of NANO flash", Jun. 30, 2011, 3 pgs.

Mogul et al., "Operating System Support for NVM+DRAM Hybrid Main Memory", 12th Workshop on Hot Topics in Operating Systems {HatOS XII), May 18, 2009, 9 pgs.

Quereshi et al., "Scalable High Performance Main Memory System Using Phase-Change Memory Technology", ISCA '09, Jun. 20, 2009, 10 pgs., Austin, Texas, USA.

Raoux et al., "Phase-Change Random Access Memory: A Scalable Technology," IBM Journal of Research and Development, vol. 52, Issue 4, pp. 465-479, Jul. 2008.

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.

\* cited by examiner

MULTI-LEVEL SYSTEM MEMORY WITH NEAR MEMORY SCRUBBING BASED ON PREDICTED FAR MEMORY IDLE TIME

FIELD OF INVENTION

The field of invention pertains generally to the computing sciences, and, more specifically, to a multi-level system memory with near memory scrubbing based on predicted far memory idle time.

BACKGROUND

A pertinent issue in many computer systems is the system memory. Here, as is understood in the art, a computing system operates by executing program code stored in system memory and reading/writing data that the program code operates on from/to system memory. As such, system memory is heavily utilized with many program code and data reads as well as many data writes over the course of the computing system's operation. Finding ways to improve system memory is therefore a motivation of computing system engineers.

FIGURES

A better understanding of the present invention can be obtained from the following detailed description in conjunction with the following drawings, in which.

Figure 3:
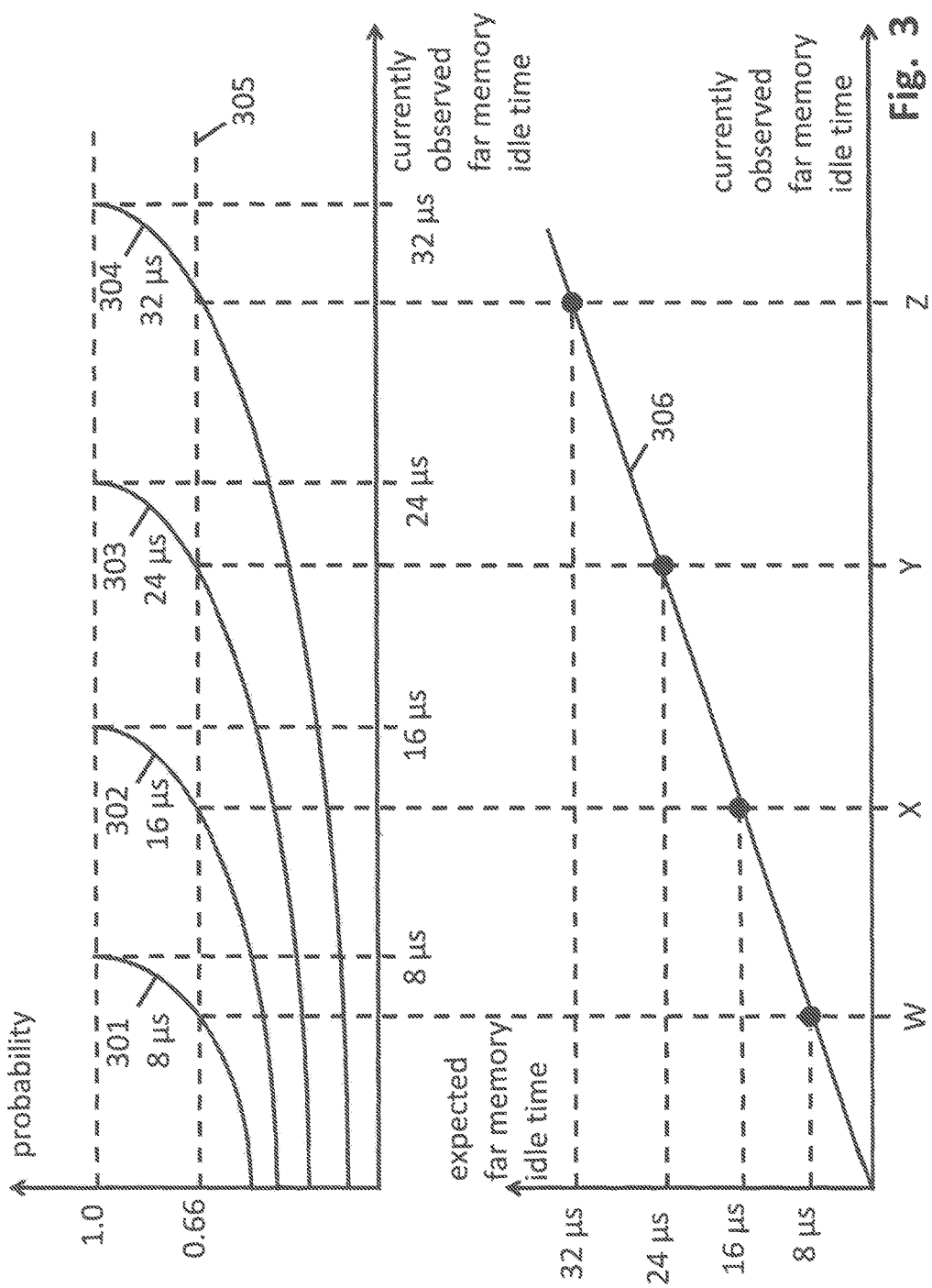
Figure 4:
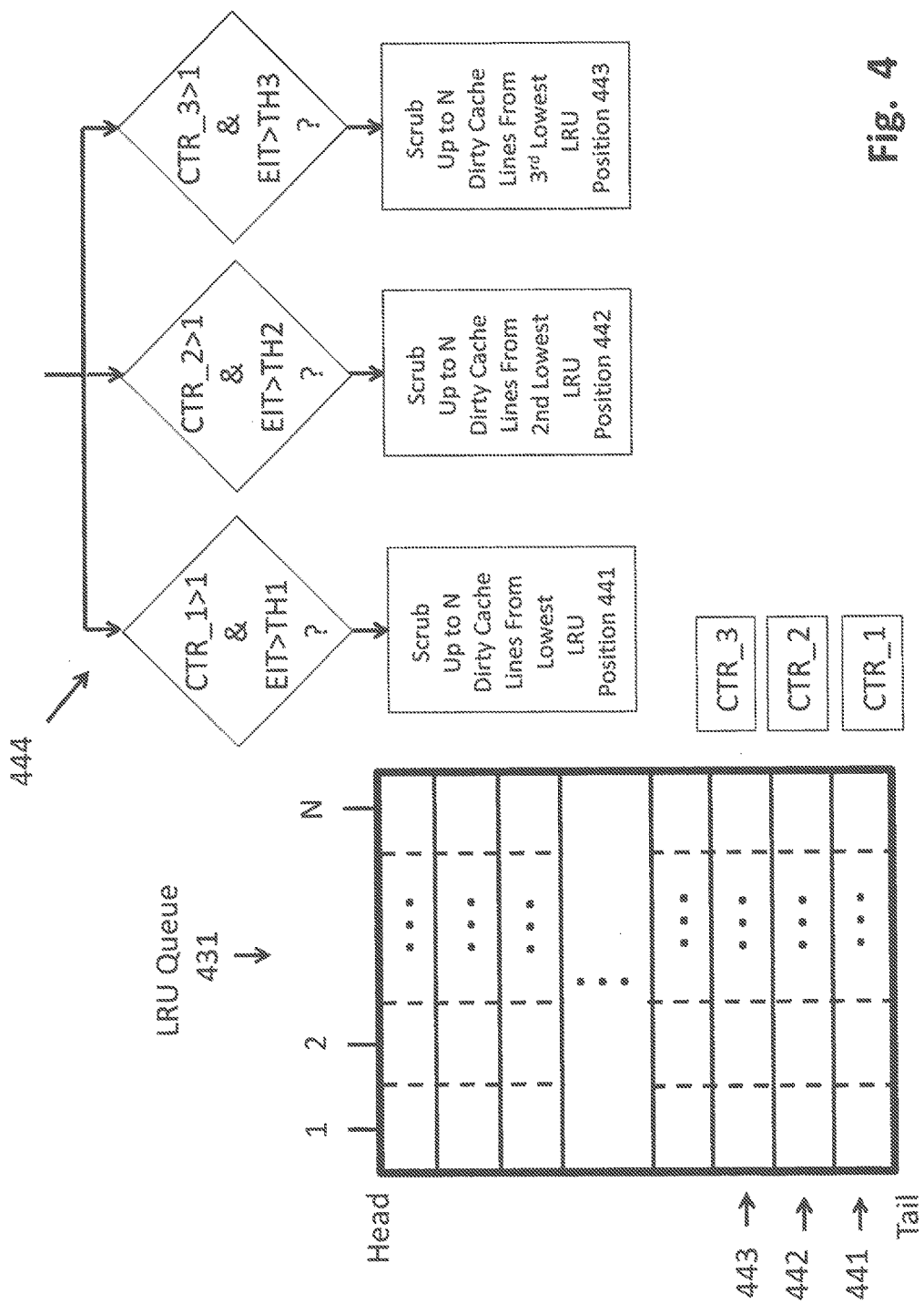
Figure 5:
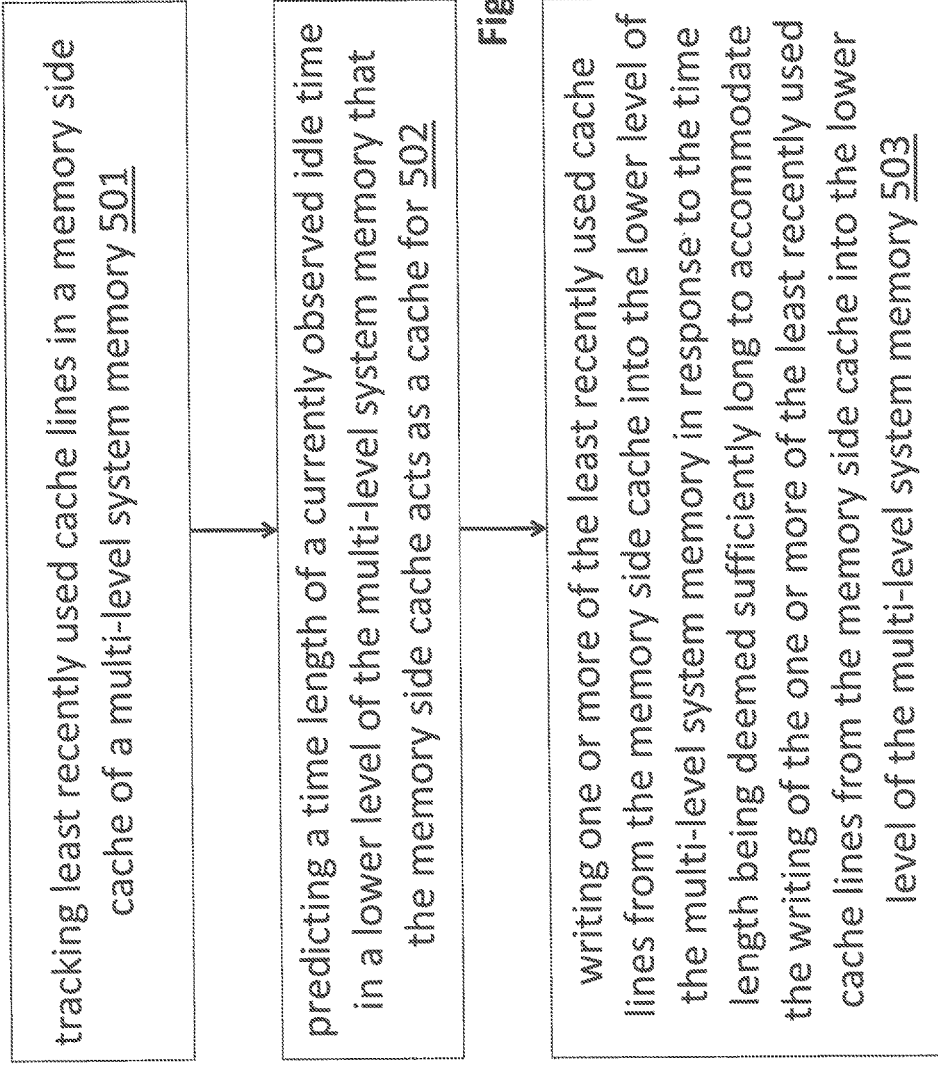
Figure 6:
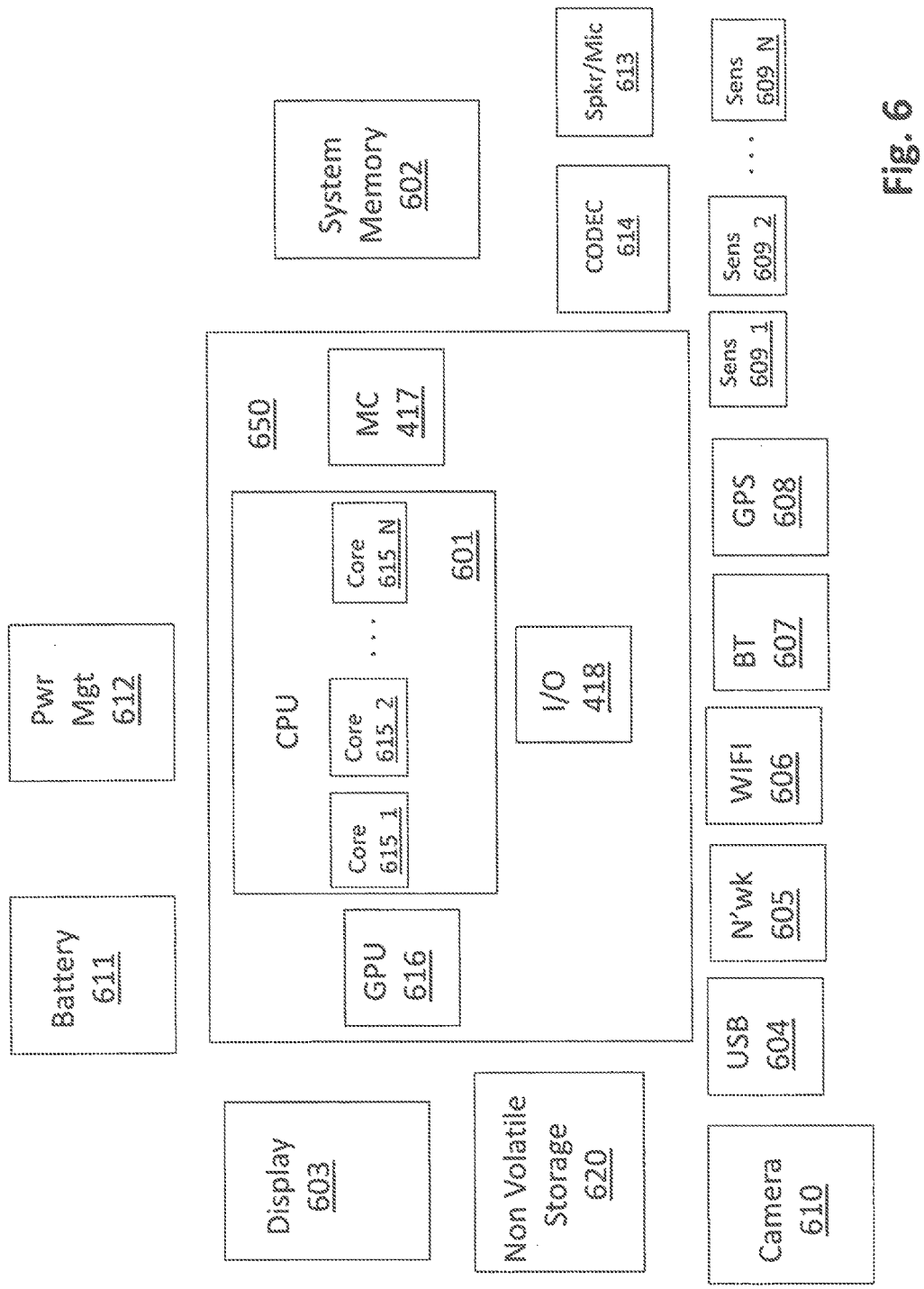

FIG. 3 idle time probability curves that a far memory idle time predictor may contemplate;

FIG. 4 shows a more detailed embodiment of a near memory scrubbing implementation;

FIG. 5 shows an embodiment of a method performed by a multi-level system memory controller FIG. 6 shows an embodiment of a computing system.

DETAILED DESCRIPTION

1.0 Multi-Level System Memory

1.a. Multi-Level System Memory Overview

Figure 1:
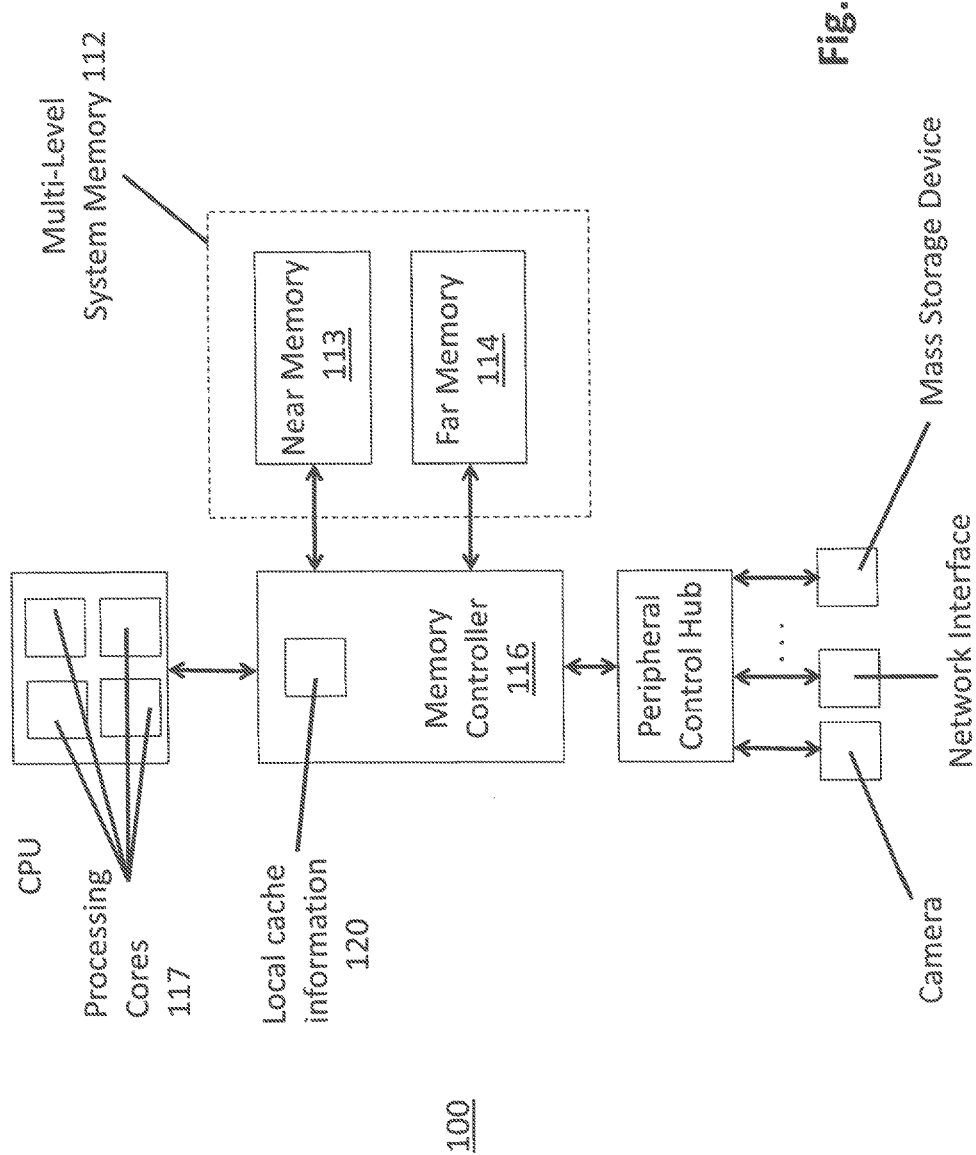
FIG. 1 shows a computing system having a multi-level system memory.

One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger far memory 114.

The use of cache memories for computing systems is well-known. In the case where near memory 113 is used as a cache, near memory 113 is used to store an additional copy of those data items in far memory 114 that are expected to be more frequently called upon by the computing system. By storing the more frequently called upon items in near memory 113, the system memory 112 will be observed as faster because the system will often read items that are being stored in faster near memory 113. For an implementation using a write-back technique, the copy of data items in near memory 113 may contain data that has been updated by the central processing unit (CPU), and is thus more up-to-date than the data in far memory 114. The process of writing back 'dirty' cache entries to far memory 114 ensures that such changes are not lost.

According to various embodiments, near memory cache 113 has lower access times than the lower tiered far memory 114. For example, the near memory 113 may exhibit reduced access times by having a faster clock speed than the far memory 114. Here, the near memory 113 may be a faster (e.g., lower access time), volatile system memory technology (e.g., high performance dynamic random access memory (DRAM)) and/or static random access memory (SRAM) memory cells co-located with the memory controller 116. By contrast, far memory 114 may be either a volatile memory technology implemented with a slower clock speed (e.g., a DRAM component that receives a slower clock) or, e.g., a non volatile memory technology that is slower (e.g., longer access time) than volatile/DRAM memory or whatever technology is used for near memory.

For example, far memory 114 may be comprised of an emerging non volatile random access memory technology such as, to name a few possibilities, a phase change based memory, a three dimensional crosspoint memory, "write-in-place" non volatile main memory devices, memory devices that use chalcogenide phase change material (e.g., glass), multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, $Ge_2Sb_2Te_5$ memory, programmable metallization cell memory, amorphous cell memory, Ovshinsky memory, etc. Any of these technologies may be byte addressable so as to be implemented as a main/system memory in a computing system.

Emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger based "block" or "sector" accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting a last level CPU cache. Generally, a CPU cache is optimized for servicing CPU transactions, and will add significant penalties (such as cache snoop overhead and cache eviction flows in the case of cache hit) to other system memory users such as Direct Memory Access (DMA)-capable devices in a Peripheral Control Hub. By contrast, a memory side cache is designed to handle, e.g., all accesses directed to system memory, irrespective of whether they arrive from the CPU, from the Peripheral Control Hub, or from some other device such as a display controller.

In various embodiments, system memory may be implemented with dual in-line memory module (DIMM) cards where a single DIMM card has both volatile (e.g., DRAM) and (e.g., emerging) non volatile memory semiconductor chips disposed in it. The DRAM chips effectively act as an on board cache for the non volatile memory chips on the DIMM card. Ideally, the more frequently accessed cache lines of any particular DIMM card will be accessed from that DIMM card's DRAM chips rather than its non volatile memory chips. Given that multiple DIMM cards may be plugged into a working computing system and each DIMM card is only given a section of the system memory addresses made available to the processing cores 117 of the semiconductor chip that the DIMM cards are coupled to, the DRAM chips are acting as a cache for the non volatile memory that they share a DIMM card with rather than as a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel are in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache.

In yet other possible configurations or implementations, a DRAM device on a DIMM card can act as a memory side cache for a non volatile memory chip that resides on a different DIMM and is plugged into a different channel than the DIMM having the DRAM device. Although the DRAM device may potentially service the entire system memory address space, entries into the DRAM device are based in part from reads performed on the non volatile memory devices and not just evictions from the last level CPU cache. As such the DRAM device can still be characterized as a memory side cache.

In another possible configuration, a memory device such as a DRAM device functioning as near memory 113 may be assembled together with the memory controller 116 and processing cores 117 onto a single semiconductor device or within a same semiconductor package. Far memory 114 may be formed by other devices, such as slower DRAM or non-volatile memory and may be attached to, or integrated in that device.

In still other embodiments, at least some portion of near memory 113 has its own system address space apart from the system addresses that have been assigned to far memory 114 locations. In this case, the portion of near memory 113 that has been allocated its own system memory address space acts, e.g., as a higher priority level of system memory (because it is faster than far memory) rather than as a memory side cache. In other or combined embodiments, some portion of near memory 113 may also act as a last level CPU cache.

In various embodiments when at least a portion of near memory 113 acts as a memory side cache for far memory 114, the memory controller 116 and/or near memory 113 may include local cache information (hereafter referred to as "Metadata") 120 so that the memory controller 116 can determine whether a cache hit or cache miss has occurred in near memory 113 for any incoming memory request.

In the case of an incoming write request, if there is a cache hit, the memory controller 116 writes the data (e.g., a 64-byte CPU cache line or portion thereof) associated with the request directly over the cached version in near memory 113. Likewise, in the case of a cache miss, in an embodiment, the memory controller 116 also writes the data associated with the request into near memory 113 which may cause the eviction from near memory 113 of another cache line that was previously occupying the near memory 113 location where the new data is written to. However, if the evicted cache line is "dirty" (which means it contains the most recent or up-to-date data for its corresponding system memory address), the evicted cache line will be written back to far memory 114 to preserve its data content.

In the case of an incoming read request, if there is a cache hit, the memory controller 116 responds to the request by reading the version of the cache line from near memory 113 and providing it to the requestor. By contrast, if there is a cache miss, the memory controller 116 reads the requested cache line from far memory 114 and not only provides the cache line to the requestor (e.g., a CPU) but also writes another copy of the cache line into near memory 113. In various embodiments, the amount of data requested from far memory 114 and the amount of data written to near memory 113 will be larger than that requested by the incoming read request. Using a larger data size from far memory or to near memory increases the probability of a cache hit for a subsequent transaction to a nearby memory location.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches.

Different types of near memory caching implementation possibilities exist. The sub-sections below describe exemplary implementation details for two types of cache architecture options: direct mapped and set associative. Additionally, other aspects of possible memory controller 116 behavior are also described in the immediately following sub-sections.

1.b. Direct Mapped Near Memory Cache

In a first caching approach, referred to as direct mapped, the memory controller 116 includes logic circuitry to map system addresses to cache line slots in near memory address space based on a portion of the system memory address. For example, in an embodiment where the size of near memory 113 corresponds to 16,777,216 cache line slots per memory channel, which in turn corresponds to a 24 bit near memory address size (i.e., $2^{24}$=16,777,216) per memory channel, 24 upper ordered bits of a request's system memory address are used to identify which near memory cache line slot the request should map to on a particular memory channel (the lower ordered bits specify the memory channel). For instance, bits A[5:0] of system memory address A identify which memory channel is to be accessed and bits A[29:6] of the system memory address identify which of 16,777,216 cache line slots on that channel the address will map to.

Additionally, upper ordered bits that are contiguous with the cache slot identification bits are recognized as a tag data structure used for identifying cache hits and cache misses. Here, different tags for a same set of bits A[29:6] map to a same cache line slot. For instance, in an embodiment, the next group of four upper ordered bits A[33:30] are recognized as a tag structure used to define 16 unique cache line addresses that map to a particular cache line slot.

The local cache information 120 therefore identifies which tag is currently being stored in each of the near memory cache line slots. Thus, when the memory controller 116 receives a memory write request, the memory controller maps bits A[29:6] to a particular slot in its local cache information 120. A cache hit results if the tag that is kept in local information 120 for the cache line slot that the request address maps to matches the tag of the request address (i.e., the cache line kept in near memory for this slot has the same system memory address as the request). Otherwise a cache miss has occurred. When the memory controller 116 writes a cache line to near memory after a cache miss, the memory controller stores the tag of the address for the new cache line being written into near memory into its local cache information for the slot so that it can test for a cache hit/miss the next time a request is received for an address that maps to the slot.

The local cache information 120 also includes a dirty bit for each cache line slot that indicates whether the cached version of the cache line in near memory 113 is the only copy of the most up to date data for the cache line. For example, in the case of a cache hit for a memory write request, the direct overwrite of the new data over the cached data without a write-through to far memory 114 will cause the dirty bit to be set for the cache line slot. Cache lines that are evicted from near memory 113 cache that have their dirty bit set are written back to far memory 114 but those that do not have their dirty bit set are not written back to far memory 114.

A valid data bit may also be kept for each cache line slot to indicate whether the version of the cache line kept in the near memory cache line slot is valid. Certain operational circumstances may result in a cache line in near memory being declared invalid. The memory controller is free to directly overwrite the cache line in near memory that is marked invalid even if the cache line overwriting it has a different tag. Generally, when a cache line is called up from far memory 114 and written into near memory 113 its valid bit is set (to indicate the cache line is valid).

1.c. Set Associative Near Memory Cache

In another approach, referred to as set associative, the memory controller includes hashing logic that performs a hash operation on the system memory address of an incoming system memory access request. The output of the hashing operation points to a "set" of entries in near memory cache where the cache line having the system memory address can be stored in the cache. In this approach, the memory controller keeps in its local cache information 120 a local set cache record that identifies, for each set of the cache, which system memory addresses are currently stored in the respective set and whether the set is full.

The local keeping of the system memory addresses permits the memory controller 116 to locally identify cache hits/misses internally to the memory controller 116. Locally tracking which sets are full also identifies to the memory controller 116 when a cache eviction is necessary. For instance, if a new memory request is received for a cache line whose system memory address maps to a set that is currently full, the memory controller will write the cache line associated with the newly received request into the set and evict one of the cache lines that is resident according to some eviction policy (e.g., least recently used, least frequently used, etc.). The memory controller may also locally keep meta data in the local cache information 120 that tracks the information needed to implement the eviction policy.

When a cache miss occurs for a write request that maps to a full set, the new cache line associated with the request is written into near memory cache and a cache line that is resident in the set is evicted to far memory if it is dirty. When a cache miss occurs for a read request that maps to a full set, the requested cache line associated with the request is read from far memory and written into near memory cache. A cache line that is resident in the set is evicted to far memory if it is dirty. Dirty bits and valid bits can also be kept for each cached cache line and used as described above.

1.d. Other Caches

As alluded to above other types of caching schemes may be applied for near memory. One possible alternative approach is where near memory is implemented as a fully associative cache. In this case, the cache is viewed as one large set that all system memory address map to. With this qualification, operations are the same/similar to those described just above. Additionally, rather than act as a memory side cache, near memory may instead be implemented as a last level CPU cache.

2.0 Scrubbing of Near Memory Based on Predicted Far Memory Idle Time

A problem that can arise in a 2LM system is the adverse effect on read requests by evictions to far memory caused by near memory cache misses of preceding write requests. For instance, in one design embodiment, a later read request can not perform its initial read into near memory until an evicted cache line that was generated from a near memory cache miss of an immediately prior write request is fully written into far memory. That is, the subsequent read request transaction cannot begin until the prior write request transaction fully completes. The "stall" of the later read request can noticeably affect the performance of the CPU platform which, e.g., may itself be stalled because it is waiting for the data targeted by the stalled read request.

Figure 2:
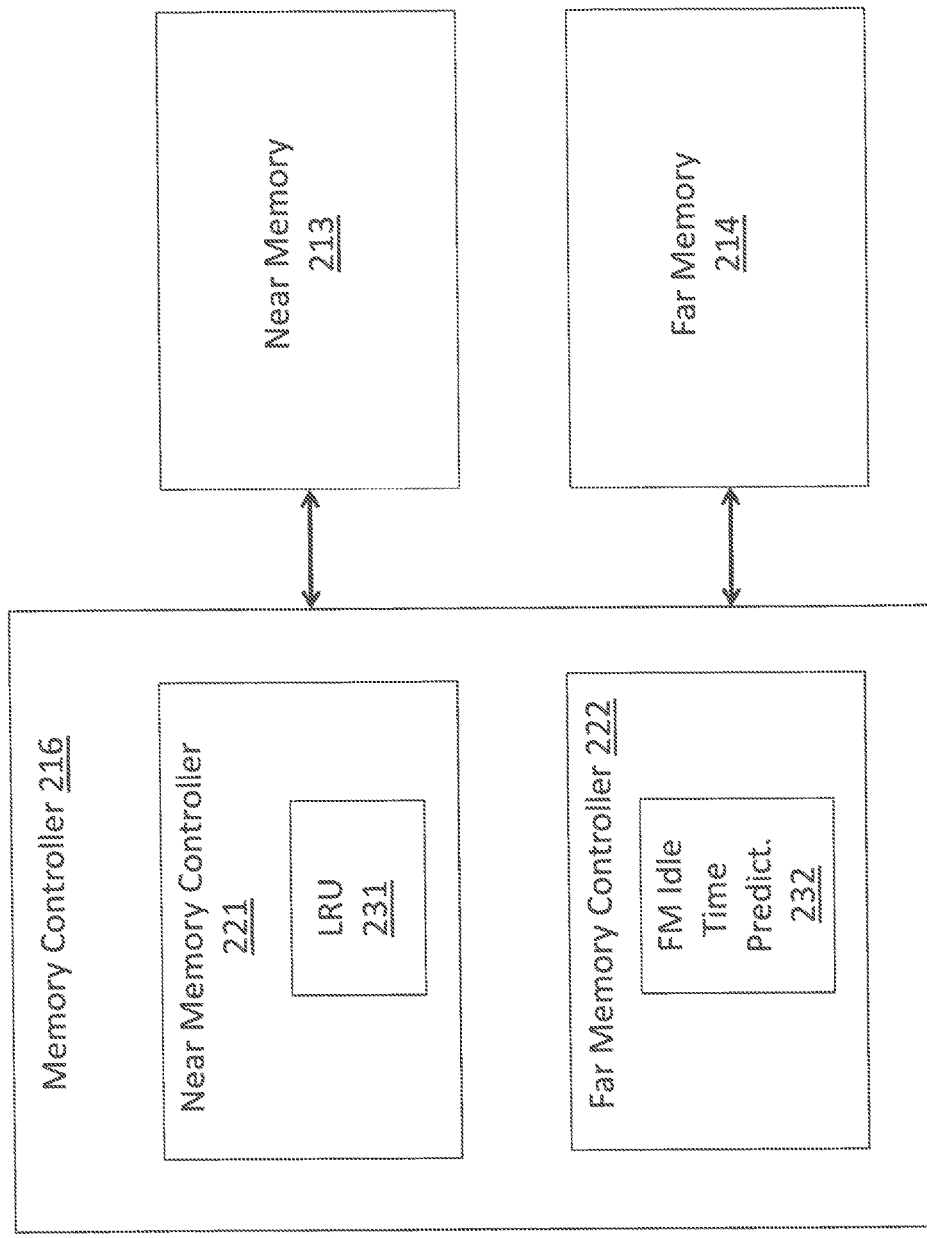
FIG. 2 shows an improved multi-level system memory controller having a near memory LRU queue and a far memory idle time predictor to scrub near memory content back to far memory.

FIG. 2 shows an improved 2LM host side solution. As observed in FIG. 2, a 2LM memory controller 216 includes a least recently used (LRU) queue 231 integrated with near memory controller 221 and a far memory idle time predictor 232 integrated with a far memory controller 222.

The LRU queue 231 identifies those cache lines that are currently kept in near memory 213 that have been least recently used. Here, "used" can mean either newly written into near memory cache or having experienced a cache hit in the near memory cache. In various embodiments, the LRU queue 231 is designed to identify the cache lines that have least recently been used in near memory 213 by keeping identifiers of such cache lines at the bottom or tail of the queue 231 and identify the most recently used cache lines by keeping identifiers of such cache lines at the top or head of the queue 232.

Here, when a cache line is "used" because it is newly written into near memory cache, an identifier of the cache line is placed at the head of the LRU queue 231. By contrast, when a cache line is "used" in near memory 213 because it has just experienced a cache hit, the cache line's identifier is removed from its current position in the LRU queue 231 and is placed at the head of the LRU queue 231. All other cache line identifiers that were previously "above" the position in the LRU queue 231 that the cache line's identifier was just pulled from are moved down one location in the LRU queue 231 toward the tail of the queue.

The far memory idle time predictor 232 monitors far memory activity including far memory idle time periods (e.g., periods of time when the far memory 214 is not being used to read or write data to/from far memory 214). From its observations of far memory behavior including, e.g., the frequency and length of far memory idle time periods, the far memory idle time predictor 232 can generate probabilities as to how long any current idle time period may last.

If a predicted idle time is long enough to warrant the writing back of cache lines from near memory 213 into far memory 214 as a background "scrubbing" process (i.e., not in response to an actual near memory cache eviction), then, in various embodiments, the memory controller 216 will proactively write cache lines that are currently kept in near memory 213 back to far memory 214. That is, the memory controller 216 will take the opportunity while the far memory 214 is idle to scrub the near memory 213 by writing cache lines from near memory 213 back to far memory 214.

In various embodiments, the memory controller 216 only scrubs dirty cache lines back to far memory 214. Again, a dirty cache line is a cache line that has the most recent data for its associated system memory address. A dirty cache line can be created, for instance, by experiencing a cache hit of a clean cache line in near memory 213 in response to a write request and writing new data over the cache line in near memory 213.

In various systems, only dirty cache lines that are evicted from near memory cache are written back to far memory 214 because they contain the most recent data for their respective system memory addresses (i.e., clean cache lines that are evicted from near memory 213 are not written back to far memory 214, rather, they are simply discarded). As such, the aforementioned problem of a later read transaction being stalled because it has to wait for completion of a write back to far memory 214 of an evicted cache line of an earlier write request only happens when the evicted cache line that is the cause of the stall is a dirty cache line.

The scrubbing of dirty cache lines that are toward the bottom of the LRU queue 231 is believed to improve overall system performance because such cache lines are the most likely to cause the aforementioned stall of upcoming read requests. That is, because they are least recently used they are more apt to be evicted from near memory cache, and because they are dirty, if such eviction were to occur, they will be written back to far memory 214.

As such, in various embodiments, the LRU queue 231 not only orders identifiers of cache lines currently resident in near memory 213 based on how recently they have been used relative to one another, but also, identifies which ones of the cache lines are dirty. For example, the identifiers of the cache lines may include an extra bit that indicates whether its corresponding cache line is dirty or not. As such, when choosing cache lines for scrubbing back to far memory 214 during far memory idle time periods, the memory controller 216 will look for the least recently used dirty cache lines (and not just the least recently used cache lines—some of which may be clean).

In still other embodiments, the LRU queue 231 may have no other purpose in the system than to support near memory scrubbing as described herein. If so, only identifiers of dirty cache lines are entered in the LRU queue 231. As such, the state of the LRU queue 231 demonstrates the recent usage history of only the dirty cache lines within near memory 213 (and not the recent usage history of all cache lines in near memory 213).

The memory controller 216, LRU queue circuitry 231 and the predictor circuitry 232 may be implemented as, e.g., electronic circuitry disposed on a semiconductor chip. Such circuitry may include dedicated logic circuitry (e.g., hardwired logic), programmable logic circuitry (e.g., programmable logic device (PLD), programmable logic array (PLA), field programmable gate array (FPGA)), circuitry that executes program code (e.g., a microprocessor, microcontroller, etc.) or any combination of these.

FIG. 3 shows an exemplary family of probability curves that can be generated by the idle time predictor 232 in response to its observations of far memory 214 behavior. Here, probability curve 301 provides the probability that a currently observed idle time will last 8 µs (micro seconds) as a function of the observed idle time, probability curve 302 provides the probability that a currently observed idle time will last 16 µs as a function of the observed idle time, probability curve 303 provides the probability that a currently observed idle time will last 24 µs as a function of the observed idle time, and, probability curve 304 provides the probability that a currently observed idle time will last 32 µs as a function of the observed idle time.

Consistent with the meaning of each curve, note that each curve yields a probability of 1.0 when its particular idle time happens to actually be observed (i.e., the 8 µs curve 301 yields a probability of 1.0 when the observed idle time reaches 8 µs, the 16 µs curve 302 yields a probability of 1.0 when the observed idle time reaches 16 µs, etc.).

From the particular observations that were used to generate curves 301 through 304, the longer the idle time being looked for, the lower the probability the idle time will actually happen. Thus, curve 304 always yields lower probabilities than curve 303, curve 303 always yield lower probabilities than curve 302, and curve 302 always yields lower probabilities than curve 301. It is important to emphasize that these probability relationships are exemplary and various computing systems may demonstrate probability trends that differ slightly or greatly than those depicted in FIG. 3.

One or more thresholds can be applied against the probability curves 301 through 304 to generate one or more probabilities that indicate whether a currently observed idle time is expected to be long enough timewise to justify attempting near memory to far memory scrubbing activity.

For instance, as just one example, consider the 0.66 probability threshold 305 observed in FIG. 3. If 0.66 is deemed an acceptable probability to start scrubbing, then, 8 µs worth of scrubbing can commence when the currently observed idle time reaches W µs, an additional 8 µs of scrubbing can commence when the currently observed idle time reaches X µs, another additional 8 µs of scrubbing can commence when the currently observed idle time reaches Y µs and yet another additional 8 µs of scrubbing can commence when the idle time reaches Z µs.

Another way of looking at the aforementioned probability analysis is that the crossing of threshold 305 signifies a certain amount of idle time is to be expected. That is, when the observed far memory idle time reaches X µs, the expected idle time period is 8 µs. Likewise, if the observed idle time continues onward and reaches Y µs the expected idle time period rises to 16 µs. If the observed idle time still continues onward and reaches Z µs the expected idle time rises to 24 µs, etc. Curve 306 of FIG. 3 shows an exemplary curve that provides expected idle time as a function of currently observed idle time.

The reader should bear in mind that the probability discussion provided just above is only exemplary. The statistical models, probabilities and expected idle time periods may vary from embodiment to embodiment in terms of how they are actually calculated.

In an embodiment, an initial unit of sought-for far memory idle time approximately corresponds to the amount of time consumed evicting a certain amount of dirty cache lines into far memory. Accordingly, the scrubbing activity can be initiated when it first makes sense to do so.

For example, referring to FIG. 3, consider a system in which approximately 8 μs is consumed reading a group of N cache lines from near memory and writing them back to far memory. Here, if a currently observed idle time reaches a point in time at which the expected idle time reaches 8 μs (W μs in FIG. 3), the memory controller 216 can read N dirty cache lines from near memory and write them back to far memory. In this case, the dirty cache lines that are written back are identified in the tail of the LRU queue 231.

If the currently observed idle time continues to expand, a next group of N dirty cache lines can be scrubbed (which will correspond to another 8 μs of scrubbing activity) if the currently observed idle time reaches X μs. Likewise, if the currently observed idle time even further continues to expand beyond X μs to Y μs, a third group of N cache lines can be scrubbed (which correspond to yet another 8 μs of scrubbing activity), etc. In this particular approach, each time a decision is made to scrub a next group of N cache lines, the next group of dirty cache lines whose identifiers are next lowest in the LRU queue are selected for scrubbing. That is, the scrubbing scheme "works up" from the bottom of the LRU queue state that existed at the start of the scrubbing sequence.

In an embodiment, there is a set limit on how far the scrubbing activity can work from the bottom of the LRU queue 231. Here, near memory cache is intended to speed-up overall system memory performance. If the scrubbing activity where to have no limit and reach into the mid or top/head sections of the LRU queue 231, the scrubbing might disadvantageously write back recently used cache lines and/or cache lines that are more likely than not to experience a cache hit. Scrubbing cache lines that are likely to receive a cache hit could hurt overall system performance because system memory will appear faster to the CPU platform if its read/write request are serviced from near memory 213 rather than far memory 214.

FIG. 4 pertains to another more detailed embodiment for proactively scrubbing near memory during far memory idle times. FIG. 4 shows an embodiment of an LRU queue 431 having N entries for cache line identifiers per LRU position. Here, the memory controller fills each LRU position before entering cache line identifiers into a next lower LRU position. That is, N cache line identifiers will be put into a same LRU position before placing less used cache line identifiers into a next lower LRU position.

In the embodiment of FIG. 4, the lower three LRU positions 441, 442, 443 each have a respective counter CTR_1, CTR_2, CTR_3 that counts how many of the cache line identifiers at its LRU position are dirty. Here, the LRU queue 431 is presumed to keep identifiers of non dirty cache lines as well as dirty cache lines. As can be seen from process 444, each of the lower three LRU positions 441-443 have their own independent condition for triggering a scrubbing of its constituent dirty cache lines back to far memory.

That is, any of the lower LRU positions 441-443 will have their constituent dirty cache lines scrubbed back to far memory if it has at least one dirty cache line (i.e., its counter is >0) and the currently observed idle time is expected to extend to some amount of time, referred to as the expected idle time (EIT), that surpasses a threshold of time that is different for each LRU position. Here, TH1 corresponds to the threshold amount of time for the lowest LRU position, TH2 corresponds to the threshold amount of time for the second lowest LRU position and TH3 corresponds to the threshold amount of time for the third lowest LRU position. The threshold amount of time is larger for higher LRU positions (i.e., TH1<TH2<TH3). If any of the lower three LRU positions 441-443 has its criteria met, it will scrub up to N dirty cache lines (if all N of its constituent cache lines are dirty) from its position to far memory.

Here, having a higher LRU position requires a longer expected idle time in order to trigger a scrub-back from its location accounts for the situation if all three lower LRU positions 441-443 concurrently have their conditions met for scrubbing back constituent dirty cache lines. If so, the second lowest LRU position 442 will have to wait a certain amount of time for the lowest LRU position 441 to scrub-back its dirty cache lines before the dirty cache lines from the second lowest LRU position 442 can be scrubbed, and, the third lowest LRU position 443 will have to wait for both the lowest and second lowest LRU positions 441, 442 to scrub their dirty cache lines before the dirty cache lines from the third lowest LRU position 443 can be scrubbed.

In an embodiment, similar to discussions provided above, N cache lines corresponds to the number of cache lines that can be scrubbed back to far memory in some block of time (e.g., 8 μs), and, the different expected idle time thresholds of the different LRU positions are set in view of this block of time and the maximum number of dirty cache lines that can be scrubbed back from an LRU position.

For example, the threshold of expected idle time for the lowest LRU position TH1 may be set to 8 μs to accommodate for the scrubbing back of N dirty cache lines from the lowest LRU position 441. Likewise, the threshold of expected idle time for the second lowest LRU position TH2 may be set to 16 μs to accommodate for the scrubbing back of N dirty cache lines from the lowest LRU position 441 and the second lowest LRU position 442. And, the threshold of expected idle time for the third lowest LRU position TH3 may be set to 24 μs to accommodate for the scrubbing back of N dirty cache lines from the lowest, second lowest and third lowest LRU positions 441-443.

FIG. 5 shows a methodology performed by a memory controller as described above. According to the methodology of FIG. 5, the method includes tracking least recently used cache lines in a memory side cache of a multi-level system memory 501. The method also includes predicting a time length of a currently observed idle time in a lower level of the multi-level system memory that the memory side cache acts as a cache for 502. The method also includes writing 503 one or more of the least recently used cache lines from the memory side cache into the lower level of the multi-level system memory in response to the time length being deemed sufficiently long to accommodate the writing of the one or more of the least recently used cache lines from the memory side cache into the lower level of the multi-level system memory.

3.0 Computing System Embodiments

FIG. 6 shows a depiction of an exemplary computing system 600 such as a personal computing system (e.g., desktop or laptop) or a mobile or handheld computing system such as a tablet device or smartphone, or, a larger computing system such as a server computing system. As observed in FIG. 6, the basic computing system may include a central processing unit 601 (which may include, e.g., a plurality of general purpose processing cores and a main memory controller disposed on an applications processor or multi-core processor), system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N (e.g., one or more of a gyroscope, an accelerometer, a magnetometer, a temperature sensor, a pressure sensor, a humidity sensor, etc.), a camera 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602. The system memory 602 may be a multi-level system memory such as the multi-level system memory discussed at length above and include a near memory controller having an LRU queue and a far memory idle time predictor.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the camera 610). Depending on implementation, various ones of these I/O components may be integrated on the applications processor/multi-core processor 650 or may be located off the die or outside the package of the applications processor/multi-core processor 650.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a memory controller to interface to a multi-level system memory, the memory controller comprising least recently (LRU) circuitry to keep track of least recently used cache lines kept in a higher level of the multi-level system memory, the memory controller comprising idle time predictor circuitry to predict idle times of a lower level of the multi-level system memory, the memory controller to write one or more lesser used cache lines from the higher level of the multi-level system memory to the lower level of the multi-level system memory in response to the idle time predictor circuitry indicating that a currently observed idle time of the lower level of the multi-level system memory is expected to be long enough to accommodate the write of the one or more lesser used cache lines from the higher level of the multi-level system memory to the lower level of the multi-level system memory.

2. The apparatus of claim 1 wherein the higher level of the multi-level system memory comprises a memory side cache for the lower level of the multi-level system memory.

3. The apparatus of claim 2 wherein the one or more lesser used cache lines are dirty cache lines.

4. The apparatus of claim 1 wherein the one or more cache lesser used cache lines are selectable from more than one position of an LRU queue that is implemented with the LRU circuitry.

5. The apparatus of claim 4 wherein the more than one position is limited to one or more lower positions of the LRU queue so as not to select cache lines for scrubbing to the lower level of the multi-level system memory that have a likelihood of experiencing a cache hit, where, the higher level of the multi-level system memory is a memory side cache for the lower level of the multi-level system memory.

6. The apparatus of claim 4 wherein different positions of the more than one LRU position have different expected idle time thresholds to trigger a scrub of their constituent cache lines from the higher level of the multi-level system memory to the lower level of the multi-level system memory.

7. The apparatus of claim 4 wherein different positions of the more than one LRU position have respective counters to count how many cache line in a particular LRU position are dirty.

8. A computing system, comprising:
one or more processing cores;
a networking interface;
a multi-level system memory;
a memory controller to interface to the multi-level system memory, the memory controller comprising least recently used (LRU) circuitry to keep track of least recently used cache lines kept in a higher level of the multi-level system memory, the memory controller comprising idle time predictor circuitry to predict idle times of a lower level of the multi-level system memory, the memory controller to write one or more lesser used cache lines from the higher level of the multi-level system memory to the lower level of the multi-level system memory in response to the idle time predictor circuitry indicating that a currently observed idle time of the lower level of the multi-level system memory is expected to be long enough to accommodate the write of the one or more lesser used cache lines from the higher level of the multi-level system memory to the lower level of the multi-level system memory.

9. The computing system of claim 8 wherein the higher level of the multi-level system memory comprises a memory side cache for the lower level of the multi-level system memory.

10. The computing system of claim 9 wherein the one or more lesser used cache lines are dirty cache lines.

11. The computing system of claim 8 wherein the one or more cache lesser used cache lines are selectable from more than one position of an LRU queue that is implemented with the LRU circuitry.

12. The computing system of claim 11 wherein the more than one position is limited to one or more lower positions of the LRU queue so as not to select cache lines for scrubbing to the lower level of the multi-level system memory that have a likelihood of experiencing a cache hit, where, the higher level of the multi-level system memory is a memory side cache for the lower level of the multi-level system memory.

13. The computing system of claim 11 wherein different positions of the more than one LRU position have different expected idle time thresholds to trigger a scrub of their constituent cache lines from the higher level of the multi-level system memory to the lower level of the multi-level system memory.

14. The computing system of claim 11 wherein different positions of the more than one LRU position have respective counters to count how many cache line in a particular LRU position are dirty.

15. A method, comprising:
tracking least recently used cache lines in a memory side cache of a multi-level system memory;
predicting a time length of a currently observed idle time in a lower level of the multi-level system memory that the memory side cache acts as a cache for; and,
writing one or more of the least recently used cache lines from the memory side cache into the lower level of the multi-level system memory in response to the time length being deemed sufficiently long to accommodate the writing of the one or more of the least recently used cache lines from the memory side cache into the lower level of the multi-level system memory.

16. The method of claim 15 wherein the one or more cache lines are dirty cache lines.

17. The method of claim 15 wherein the time length is deemed long enough to select cache lines from more than one position of a least recently used queue that is used to perform the tracking of the least recently used cache lines.

18. The method of claim 17 wherein the more than one position is limited to lowest positions in the least recently used queue so that cache lines that are likely to experience a cache hit in the memory side cache are not written back to the lower level of the multi-level system memory.

* * * * *